United States Patent [19]
Suzuki

[11] Patent Number: 5,615,661
[45] Date of Patent: Apr. 1, 1997

[54] CONTROL FOR ENGINE

[75] Inventor: Toshio Suzuki, Iwata, Japan

[73] Assignee: Yamaha Hatsudoki Kabushiki Kaisha, Iwata, Japan

[21] Appl. No.: 512,064

[22] Filed: Aug. 7, 1995

Related U.S. Application Data

[62] Division of Ser. No. 297,646, Aug. 29, 1994, Pat. No. 5,474,053.

[30] Foreign Application Priority Data

Aug. 31, 1994 [JP] Japan .................................. 5-216383

[51] Int. Cl.$^6$ ................................................ F02D 41/14
[52] U.S. Cl. ........................................................ 123/688
[58] Field of Search ............................... 123/679, 685, 123/686, 688, 700, 701, 527

[56] References Cited

U.S. PATENT DOCUMENTS

| | | | |
|---|---|---|---|
| 3,996,908 | 12/1976 | Brown, III et al. | 123/585 |
| 3,996,909 | 12/1976 | Fischer | 123/585 |
| 4,089,311 | 5/1978 | Brettschneider et al. | 123/702 |
| 4,155,335 | 5/1979 | Hosaka et al. | 123/688 |
| 4,208,990 | 6/1980 | Asano | 123/688 |
| 4,213,180 | 7/1980 | Marchak et al. | 123/688 |
| 4,216,757 | 8/1980 | Romann | 123/179.15 |
| 4,285,700 | 8/1981 | Fox | 48/180.1 |
| 4,347,824 | 9/1982 | Pierson | 123/527 |
| 4,369,749 | 1/1983 | Sugi | 123/439 |
| 4,385,613 | 5/1983 | Yoshida et al. | 123/685 |
| 4,404,947 | 9/1983 | Swanson | 123/527 |
| 4,413,607 | 11/1983 | Batchelor et al. | 123/527 |
| 4,449,502 | 5/1984 | Furuhashi | 123/688 |
| 4,457,279 | 7/1984 | Teramura et al. | 123/439 |
| 4,485,792 | 12/1984 | van der Weide | 123/527 |
| 4,492,204 | 1/1985 | Bertsch et al. | 123/685 |
| 4,492,205 | 1/1985 | Jundt et al. | 123/688 |
| 4,517,134 | 5/1985 | Nakamura et al. | 261/39.2 |
| 4,528,957 | 7/1985 | Jundt et al. | 123/688 |
| 4,541,397 | 9/1985 | Young | 123/527 |
| 4,545,350 | 10/1985 | Nakamura et al. | 123/439 |
| 4,554,896 | 11/1985 | Sougawa | 123/179.16 |
| 4,572,149 | 2/1986 | Hasegawa et al. | 123/700 |
| 4,589,397 | 5/1986 | Stankewitsch | 123/590 |
| 4,606,319 | 8/1986 | Silva | 123/525 |
| 4,628,883 | 12/1986 | Kataoka | 123/682 |
| 4,638,783 | 1/1987 | Snyder | 123/527 |
| 4,686,951 | 8/1987 | Snyder | 123/527 |
| 4,696,278 | 9/1987 | Ito et al. | 123/493 |
| 4,699,630 | 10/1987 | Lee et al. | 48/180.1 |
| 4,742,808 | 5/1988 | Blumel et al. | 123/688 |
| 4,774,909 | 10/1988 | Dolderer | 123/1 A |
| 4,813,390 | 3/1989 | Bennett | 123/577 |
| 4,813,394 | 3/1989 | St. Clair | 123/527 |
| 4,829,957 | 5/1989 | Garretson et al. | 123/37 GE |
| 4,834,050 | 5/1989 | Uranishi et al. | 123/699 |
| 4,843,558 | 6/1989 | Bergmann et al. | 364/431.03 |
| 4,858,583 | 8/1989 | Sonntag | 123/527 |
| 4,864,991 | 9/1989 | Snyder et al. | 123/344 |
| 4,867,127 | 9/1989 | Quirchmayr et al. | 123/527 |

(List continued on next page.)

FOREIGN PATENT DOCUMENTS

| | | |
|---|---|---|
| 0346989 | 12/1989 | European Pat. Off. . |
| 3321424 | 8/1984 | Germany . |
| 0217747 | 12/1983 | Japan . |
| 0176444 | 10/1984 | Japan . |
| 1327513 | 8/1973 | United Kingdom . |

*Primary Examiner*—Willis R. Wolfe
*Attorney, Agent, or Firm*—Knobbe, Martens, Olson & Bear LLP

[57] ABSTRACT

A feedback fuel control circuit for an engine to maintain a stoichiometric fuel/air ratio through adjustment of the fuel supply system. The system operates with a sensor that does not output a signal until the engine temperature is more than a predetermined temperature. Therefore, during the times when the output engine combustion sensor is not at its operating temperature the feedback control is disabled and a lean fuel air mixture is supplied to the engine. This mixture is temporarily enriching during the warmup cycle to determine if the combustion sensor outputs a signal and when it does the system switches to feedback control.

16 Claims, 5 Drawing Sheets

U.S. PATENT DOCUMENTS

| | | | |
|---|---|---|---|
| 4,870,933 | 10/1989 | Mizuno | 123/325 |
| 4,915,081 | 4/1990 | Fujimoto et al. | 123/682 |
| 4,938,199 | 7/1990 | Sato et al. | 123/585 |
| 4,953,516 | 9/1990 | van der Weide et al. | 123/527 |
| 4,970,858 | 11/1990 | Matsuoka | 60/274 |
| 4,980,834 | 12/1990 | Ikeda et al. | 123/688 |
| 5,058,556 | 10/1991 | Fukuma et al. | 123/682 |
| 5,065,728 | 11/1991 | Nakaniwa | 123/688 |
| 5,076,245 | 12/1991 | Jones | 123/527 |
| 5,101,799 | 4/1992 | Davis et al. | 123/527 |
| 5,150,673 | 9/1992 | Hoshiba et al. | 123/179.15 |
| 5,150,690 | 9/1992 | Carter et al. | 123/527 |
| 5,172,678 | 12/1992 | Suzuki | 123/688 |
| 5,337,722 | 8/1994 | Kurihara et al. | 123/527 |
| 5,423,203 | 6/1995 | Namiki et al. | 123/688 |

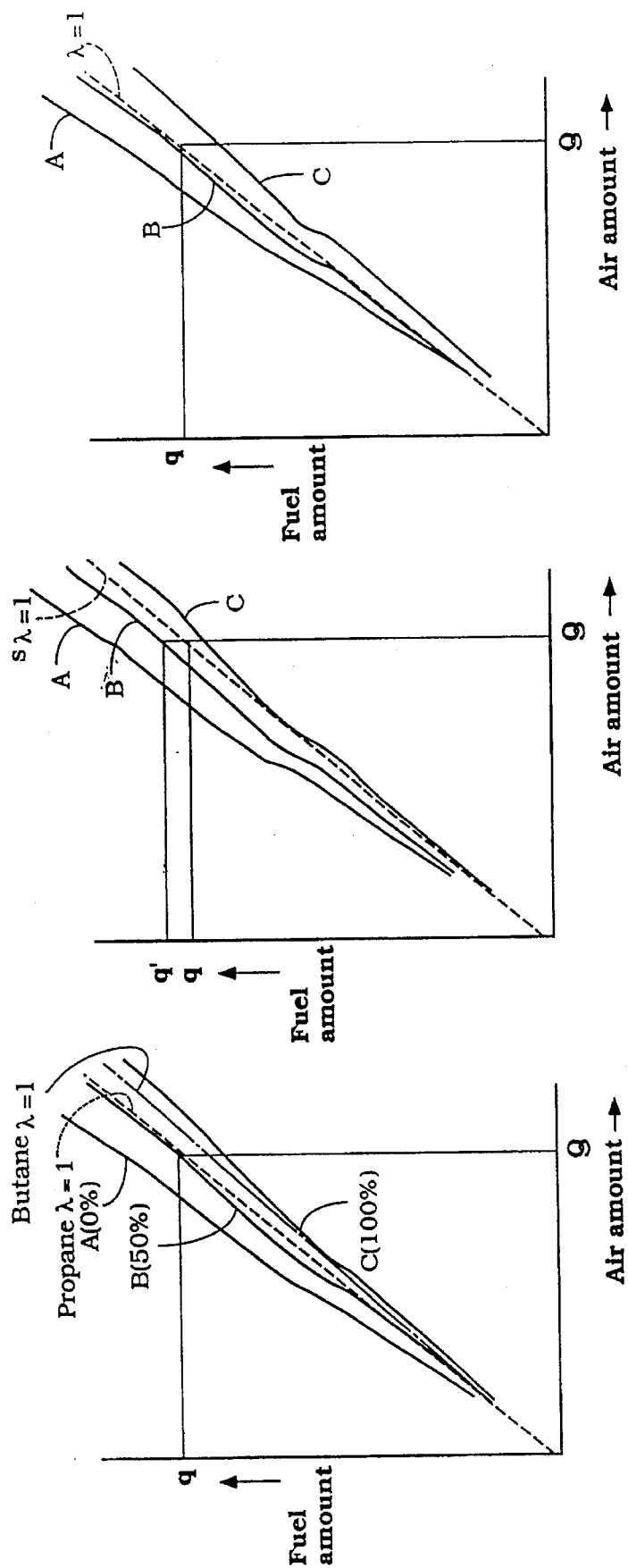

CONTROL FOR ENGINE

This application is a divisional of U.S. patent application Ser. No. 08/297,646, filed Aug. 29, 1994, now U.S. Pat. No. 5,474,053.

BACKGROUND OF THE INVENTION

This invention relates to an engine and more particularly to an improved control for an engine and an arrangement for facilitating feedback control to maintain good fuel economy and good exhaust emission.

It has been recognized that there are a number of advantages in employing gaseous fuel internal combustion engines. Such engines run on a gaseous fuel which is stored under a highly compressed state, frequently as a liquid and which is vaporized and mixed in a charge former for forming a fuel air charge for engine operation. The operation of engines on gaseous fuels conserves natural resources and also can have ecological advantages in that it offers better exhaust emission control. In addition, such fuels have also been found to lengthen the life of the engine.

One particularly advantageous system is disclosed in U.S. Pat. No. 5,337,722, entitled "Fuel Control and Fuel Feed System for Gas Fueled Engine," issued Aug. 16, 1994 and assigned to the assignee hereof. This system employs an exhaust combustion sensor which senses the air/fuel ratio and provides a signal which permits feedback control to maintain the fuel/air ratio under stoichiometric or λ1 conditions throughout the engine running. λ1 is referred to as the ratio of the actual air/fuel ratio to the ideal stoichiometric air/fuel ratio at a given running condition. In the aforenoted patent, that is achieved through the use of an oxygen sensor in the exhaust which outputs a signal when the fuel/air mixture is rich.

As noted in that patent, the oxygen sensor must reach a certain temperature before it will output a signal. Therefore, cold starting cannot be accomplished with the feedback control since the sensor will not output a signal indicative of the fuel/air ratio. In addition, it is necessary to determine when the sensor is operating so as to provide an output signal so that the system can be switched over to a feedback control.

In accordance with the arrangement shown in that patent, a separate circuit is provided for bleeding additional gaseous fuel to the engine during cold starting and cold running so as to ensure that the oxygen center will output a rich signal as soon as the sensor reaches operating temperature.

However, that arrangement is somewhat complicated in that it requires additional fuel circuit and control therefor. In addition, the system requires rich running during cold starting and cold warmup and thus emission control and efficiency is deteriorated.

It is, therefore, a principle object of this invention to provide an improved method and apparatus for a system in the cold starting operation of an engine having feedback control.

It is a further object of this invention to provide an improved feedback control system and method for an engine wherein the sensor can be periodically tested during the warmup operation to determine when it is at operating temperature so that feedback control can be employed.

It is a further object of the invention to provide an improved method and apparatus for performing this function without necessitating a constantly rich mixture during warmup.

SUMMARY OF THE INVENTION

This invention is adapted to be embodied in an engine and a method for operating it that has an induction system including a charge former for supplying a fuel/air mixture to the engine and which charge former comprises an air induction passage for receiving atmospheric air and a fuel supply circuit for receiving fuel from a source of fuel and mixing the fuel with the air in the induction passage for forming a fuel/air mixture for the engine operation for controlling the amount of air bled into the fuel supply circuit to control the mixture strength. An engine combustion sensor is provided in the engine for detecting the air/fuel ratio. Feedback control means receives the signal from the engine combustion sensor and control the mixture strength to maintain the desired air/fuel ratio. The engine combustion sensor does not output a signal until it is at a temperature above the predetermined temperature which predetermined temperature comprises its operating temperature.

In accordance with an apparatus for performing the invention, the invention is provided with a starting device and in response to the operation of the starting device, the feedback control is temporarily disabled. During initial engine start-up and fast idle warmup, the fuel/air ratio is adjusted by a predetermined map to provide a leaner than stoichiometric mixture. Periodically, the mixture strength is altered to a rich mixture position and the output of the combustion sensor is read and if the combustion sensor is outputting a signal then the system is switched over to feedback control.

In accordance with a method for practicing the invention the feedback control is discontinued upon initial starting of the engine and the fuel/air ratio is set in a lean mixture condition. At selected time intervals, the fuel/air ratio is changed to a rich mixture condition and the combustion sensor output is sensed. If the combustion sensor outputs a signal then the system is switched over to feedback control.

BRIEF DESCRIPTION OF THE DRAWINGS

FIG. 3 is a graphical view showing the fuel volume flow versus air intake volume for the design specification engine employing either a butane-type fuel, as shown by the dot-dash line, or a propane-type fuel, as shown by the broken line.

FIG. 4 is a graphical view, in part similar to FIG. 1, and shows the condition of one way in which the system may deteriorate due to age and using the example of operation on propane fuel.

FIG. 5 is a graphical view, in part similar to FIGS. 3 and 4, and shows how the system can be returned to normal by manual adjustment.

DETAILED DESCRIPTION OF THE PREFERRED EMBODIMENTS OF THE INVENTION

Figure 1:
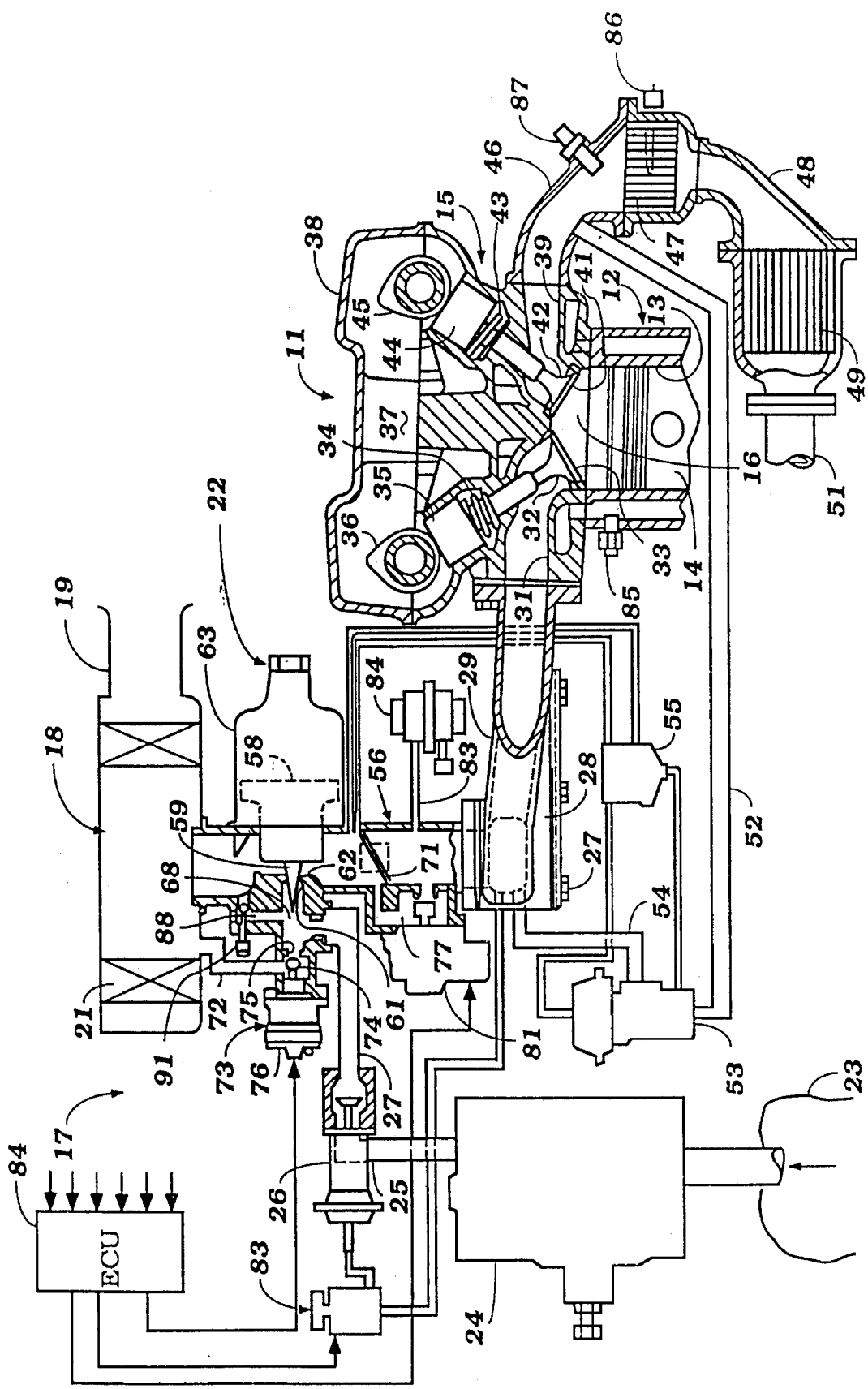
FIG. 1 is a partially schematic cross-sectional view taken through portions of an internal combustion engine constructed and operated in accordance with an embodiment of the invention.

Referring now in detail to the drawings and initially primarily to FIG. 1, an internal combustion engine constructed in accordance with an embodiment of the invention is shown partially and is identified generally by the reference numeral 11. The engine 11 is depicted only partially and by way of a cross-sectional view through a single cylinder because the invention deals primarily with the charge-forming system for the engine and its control. Therefore, when any details of the engine 11 are not described, they may be considered to be of any conventional type as well known in this art.

For reference purposes, the engine 11 is comprised of a cylinder block, indicated generally by the reference numeral 12, which in the illustrated embodiment is of the in-line multiple cylinder type and has cylinder bores 13 formed in the cylinder block 12. Although the invention is described in conjunction with an in-line engine, it will be readily apparent to those skilled in the art how the invention can be employed with engines having other cylinder configurations. Furthermore, although the invention is described in conjunction with a four-cycle reciprocating engine, it should be readily apparent to those skilled in the art that the various features of the invention can also be employed with engines operating on a two-stroke principle or engines operating on other principles and engines other than reciprocating engines, such as rotary engines.

Pistons 14 are slidably supported within the cylinder bores 13 and are connected in a well-known manner by connecting rods to a crankshaft (not shown). Since the invention deals primarily with the induction system for the engine and the associated exhaust system and feedback control, the lower end of the engine 11 has not been depicted in the drawings.

A cylinder head assembly 15 is affixed to the cylinder block 12 in a known manner and has individual recesses 16 which cooperate with the cylinder bores 13 and pistons 14 to form the individual combustion chambers of the engine. An induction and exhaust system, to be described, is formed in the cylinder head assembly 15 for delivering a combustible mixture to the combustion chambers 16, firing them and exhausting the burned charge to the atmosphere.

The induction system, in accordance with an embodiment of the invention, is identified generally by the reference numeral 17 and will be described in more detail later by reference to FIG. 2. However, the induction system 17 includes an air cleaner 18 having an atmospheric air inlet 19 through which atmospheric air is drawn and a filter element 21 for filtering foreign particles from the inducted air.

This air is then delivered to a charge former, indicated generally by the reference numeral 22, and which has a construction as will be best described by reference to FIG. 2. This charge former 22 receives a gaseous fuel from a source of such fuel under pressure, normally stored as a liquid, which is shown partially and as identified by the reference numeral 23. The gaseous fuel is delivered to a pressure regulator 24 that reduces the pressure in two stages to a pressure less than atmospheric, as described in the aforenoted patent and is then delivered through a conduit 25 to a deceleration fuel shut-off valve 26. The deceleration shut-off valve 26 is operated in a manner that will be described later. From the shut-off valve 26, the fuel is delivered to the fuel discharge circuit or circuits of the charge-forming device 22, and the manner in which this is done will be described later in more detailed reference to FIG. 2.

Continuing on to describe the induction system 17, the fuel-air mixture that has been formed by the carburetor 22 is then delivered to an intake manifold, indicated generally by the reference numeral 27, and more specifically to a plenum chamber 28 formed at the inlet thereof. The inlet manifold 27 has a plurality of runners, one being shown in FIG. 1 and is identified by the reference numeral 29, that communicate with intake passages 31 formed in the cylinder head 15 at one side thereof in a well-known manner.

In the illustrated embodiment, each combustion chamber 16 is provided with two intake valves 32 and which are served by respective intake passages 31 or by a Siamesed intake passage. These intake valves 32 cooperate with respective valve seats 33 formed in the cylinder head 15 to control the communication with the combustion chamber 16. Coil compression springs 34 normally urge the intake valves 32 to their closed position. Thimble tappets 35 are slidably supported within the cylinder head 15 and are operated by the lobes of an intake camshaft 36 for opening the intake valves 32 in a well-known manner.

The intake camshaft 36 is driven from the crankshaft of the engine at one-half crankshaft speed, as is well known in this art. The camshaft 36 is contained within a cam chamber 37 formed at the upper end of the cylinder head 15 and which is enclosed by a cam cover 38 in a well-known manner.

The combustible charge which is delivered to the combustion chamber 16 by the induction system as thus far described is then fired by one or more spark plugs mounted in the cylinder head 15 in a well-known manner. This charge can then exit the combustion chambers through exhaust passages 39 formed in the cylinder head 15 on the side opposite the intake passages 31. Valve seats 41 are provided at the combustion chamber side of the exhaust passages 39, and the flow through them is controlled by a pair of exhaust valves 42 also mounted in the cylinder head 15 on this side of the engine. Coil compression springs 43 urge the exhaust valves 42 to their closed position.

Thimble tappets 44 are slidably supported within the cylinder head 15 and are operated by means of the lobes of an exhaust camshaft 45 that is journaled in the cam chamber 37 and driven at one-half camshaft speed along with the intake camshaft 36 by any known type of cam drive. It should be noted that although the invention is described in conjunction with a four-valve-per-cylinder engine, the invention can be utilized with engines of the four-cycle type having other valving arrangements. As has already been noted, the invention can also be employed with ported or rotary engines.

An exhaust manifold 46 is affixed to the exhaust side of the cylinder head 15 and registers with the exhaust passages 39 for collecting the exhaust gases and discharging them to a common outlet in which a first catalyst bed 47 of any desired type may be positioned. It is desirable to maintain the first catalyst bed as close to the exhaust passages 39 as possible so as to ensure rapid heating of the catalyst bed 47 and effective operation thereof.

An exhaust pipe 48 communicates with the downstream side of the catalyst bed 47 and with the upstream side of a second catalyst bed 49, which may also be of any known type. The catalyst bed 49 discharges the exhaust gases to the atmosphere through an exhaust system which may include one or more mufflers and which is shown only partially and is identified generally by the reference numeral 51.

In order to control certain emissions, for example, those of nitrous oxides or the like, an exhaust gas recirculation system is also incorporated, which includes an EGR line 52 that is tapped off of the exhaust manifold 46 and which delivers the exhaust gases to an EGR valve 53. The EGR valve 53 selectively returns a portion of the exhaust gases to the engine through its induction system by discharging the exhaust gases through a conduit 54 into the plenum chamber 28 of the intake manifold 27. An EGR control 55 of any known type operates the EGR valve 53 to provide the desired strategy for control.

The engine 11 and auxiliaries as thus far described may be considered to be conventional, and for that reason, further details of the conventional components of the engine are not believed to be necessary to permit those skilled in the art to understand and practice the invention.

The charge-forming device or carburetor 22, which forms an important portion of the invention, is depicted in more detail in FIG. 2 and will now be described in more detail by reference to that figure. The carburetor 22 includes a main body assembly 56 that forms an induction passage 57, which communicates at its inlet end with the air cleaner 18 and at its outlet end with the plenum chamber 28 of the intake manifold 27.

The carburetor 22 is of the constant depression or air valve type and includes a sliding piston 58 that has an end portion which carries a metering rod 59 that is received within a metering jet 61 formed in a portion 62 of the induction passage 57 in confronting relation to the sliding piston 58. The piston 58 is received within a housing assembly 63 and defines a first chamber A that is exposed to the pressure at the throat of the carburetor 22 defined by the sliding piston 58 and induction passage portion 62 through a bleed opening 64. A coil compression spring 65 is received in the chamber A and normally urges the sliding piston 58 to a direction to restrict the cross-sectional area of the throat.

The remaining chamber B defined by the piston 58 and housing 63 is exposed to atmospheric air pressure through an atmospheric air pressure port 66 which actually faces the inner side of the air cleaner 18 and thus senses the pressure of the air that will be introduced into the induction passage 57. As is well known in this art, the piston 58 will move to a position dependent upon the pressure difference to maintain a substantially constant pressure drop across the throat of the carburetor 22. At the same time, the amount of fuel metered by the metering rod 59 will vary depending upon the piston position.

As has been noted, fuel from the source 23 is provided to the fuel discharge circuit of the carburetor 22 from the shut-off valve 26. This shut-off valve delivers the fuel to a conduit 67, which communicates with a mixing chamber 68 formed at the base of the metering jet 61. The conduit 67 is provided with a metering orifice 69 that leads to the mixing chamber 68 for controlling the amount of fuel which can enter the chamber 68.

A throttle valve 71 is positioned in the induction passage 57 downstream of the sliding piston 58 and is connected in a well-known manner to a remotely positioned operator-controlled throttle.

As will become apparent, the metering jet 61 and metering rod 59 provide the desired fuel-air ratio under substantially all engine running conditions. However, fine-tuning adjustment is made by a feedback control system, which will be described, but which includes an air bypass system for bleeding controlled amount of air into the mixing chamber 68 for providing fine tuning of the air-fuel ratio so as to ensure that the engine runs on a stoichiometric condition under all running conditions.

This system includes an air bleed passage 72 which extends from the air filter 18 downstream of the filter element 21 to an automatic air bleed valve, indicated generally by the reference numeral 73, and which includes a valving element 74 that cooperates with a metering orifice 75 so as to control the flow of air into the mixing chamber 68. The valve element 74 is controlled by a servo or stepper motor 76 which operates in step increments so as to control the degree of closure of the orifice 75 and, accordingly, the amount of air bled into the mixing chamber 68 for fine tuning of the mixture strength to maintain a λ1 condition.

Although idle speed of the engine 11 can be controlled by controlling the position of the throttle valve 71 at idle, a more accurate idle control is provided by an idle bypass circuit 77 which is formed in the carburetor body 56 and which extends from a position slightly above the idle position of the throttle valve 71 to a position below it defined by an idle discharge orifice 78. An idle control valve 79 is operatively connected to a further, idle stepper motor 81, which is controlled so as to provide control of the idle speed of the engine without necessitating adjustment of the idle speed of the throttle valve 71.

The remaining components of the charge-forming system and the controls therefor will now be described primarily by reference to FIG. 1. It has been noted that the fuel shut-off valve 26 is provided in the fuel supply circuit for the charge former 22. This shut-off valve is closed under extreme deceleration conditions so as to avoid fuel being drawn into the engine through its induction system when it acts like a pump on extreme deceleration.

Therefore, there is provided an intake manifold vacuum sensor 82 that has a pressure conduit 83 to sense the pressure in the induction system downstream of the throttle valve 71. During extreme decelerations, there will be a large manifold vacuum exerted, and this, coupled with other factors, can be employed as a condition for shutting off the fuel supply valve 26. This is done by means of a decell shut-off control 83 that is operated by an ECU 84, which controls a number of engine functions and which receives a number of input signals from various sensors, some of which will be described.

It should be understood that although certain types of sensors are to be described, it will be obvious to those skilled in the art how other parameters may also be employed for engine control. When the extreme deceleration condition is sensed, the ECU 84 outputs a signal to the decell shut-off control 83, which, in turn, actuates a vacuum motor in the shut-off valve 26 to discontinue the supply of fuel from the pressure regulator 24 to the mixing chamber 68 of the fuel discharge circuit of the carburetor 22.

Among the other sensors which may be employed for sending signals to the ECU 84 for various engine control functions is a water-temperature sensor 85 that is tapped into the cooling jacket of the cylinder block 12 and which outputs a signal indicative of engine water temperature. In addition, a temperature probe 86 extends into at least the catalyst bed 47 to provide a signal indicative of its temperature.

The important control for the charge-forming system which entails the invention is the use of an exhaust sensor 87, which in the illustrated embodiment is an oxygen ($O_2$) sensor that is placed into the exhaust manifold 46 upstream of the first catalyst bed 47. This oxygen sensor, as is typical with this type of sensor, will only output a signal when the oxygen condition is above a certain level, and this occurs when the air-fuel ratio mixture A/F is richer than the stoichiometric desired air-fuel ratio, a detection signal will be outputted. These sensors do not become operative until they are at more than a certain temperature, such as 350° C., and hence, the sensor 87 will not output a signal when the air-fuel mixture is leaner than stoichiometric or when the exhaust temperature is less than 350° C. Although it may be possible to employ other types of sensors for the control, certain aspects of the control routine are particularly useful with this type of sensor. However, those skilled in the art will readily understand how the arrangement can be employed in connection with other types of sensors; for example, sensors which emit a detection signal when the fuel-air mixture is leaner than the theoretical stoichiometric ratio for a given engine running condition.

Basically, the ECU 86 is programmed so as to adjust the amount of air bleed by the air bleed control valve 74 by actuating the stepper motor 76 in response to output signals from the sensor 87 once it is at its operating temperature. Basically, the system is designed so that upon initial start-up and with all new components, the valve 74 will be positioned at a point that is at approximately one-half of its total travel, i.e., at its 50-percent position, as shown in FIG. 3. FIG. 3 shows in broken-line curve the optimum or stoichiometric amount of fuel flow q in response to air intake flow Q for propane. This broken line is the λ1 condition. The carburetor 22 is adjusted and jetted so as to attempt to maintain this ratio as close as possible when the valve 74 is set at its 50-percent position, as shown in FIG. 3 by the 50-percent curve B. Thus, if the air-fuel ratio varies on either side (rich or lean) from the line B, the stepper motor 76 is actuated accordingly so as to maintain the air-fuel ratio at the λ1 condition. This curve also shows the relationship of air-fuel ratios that will exist when the valve 74 is fully closed (curve A, zero percent) or fully opened (curve C, 100 percent).

The dot-dash line curve of FIG. 3 shows the stoichiometric ratio if the fuel employed is primarily butane, as opposed to propane, but the same principle would apply.

After the engine has run for some time period and/or as the components wear, the air-fuel ratio will drift slightly, although the feedback control will still maintain the air bleed valve 74 in a condition to maintain the λ1 situation. This is shown in FIG. 4, wherein the system drifts toward the rich side, and hence, additional air bleed is required. It will be seen that if this condition prevails, then the stepper motor 76 may not have a sufficient range of movement to maintain the λ1 condition under all running conditions. Therefore, in accordance with an embodiment of the invention, the system is provided with a manually adjustable bypass system so as to make adjustments and bring the condition as shown in FIG. 4 back into the condition as shown in FIG. 5 by bleeding either less or more air into the system, depending upon the direction of drift.

Figure 2:
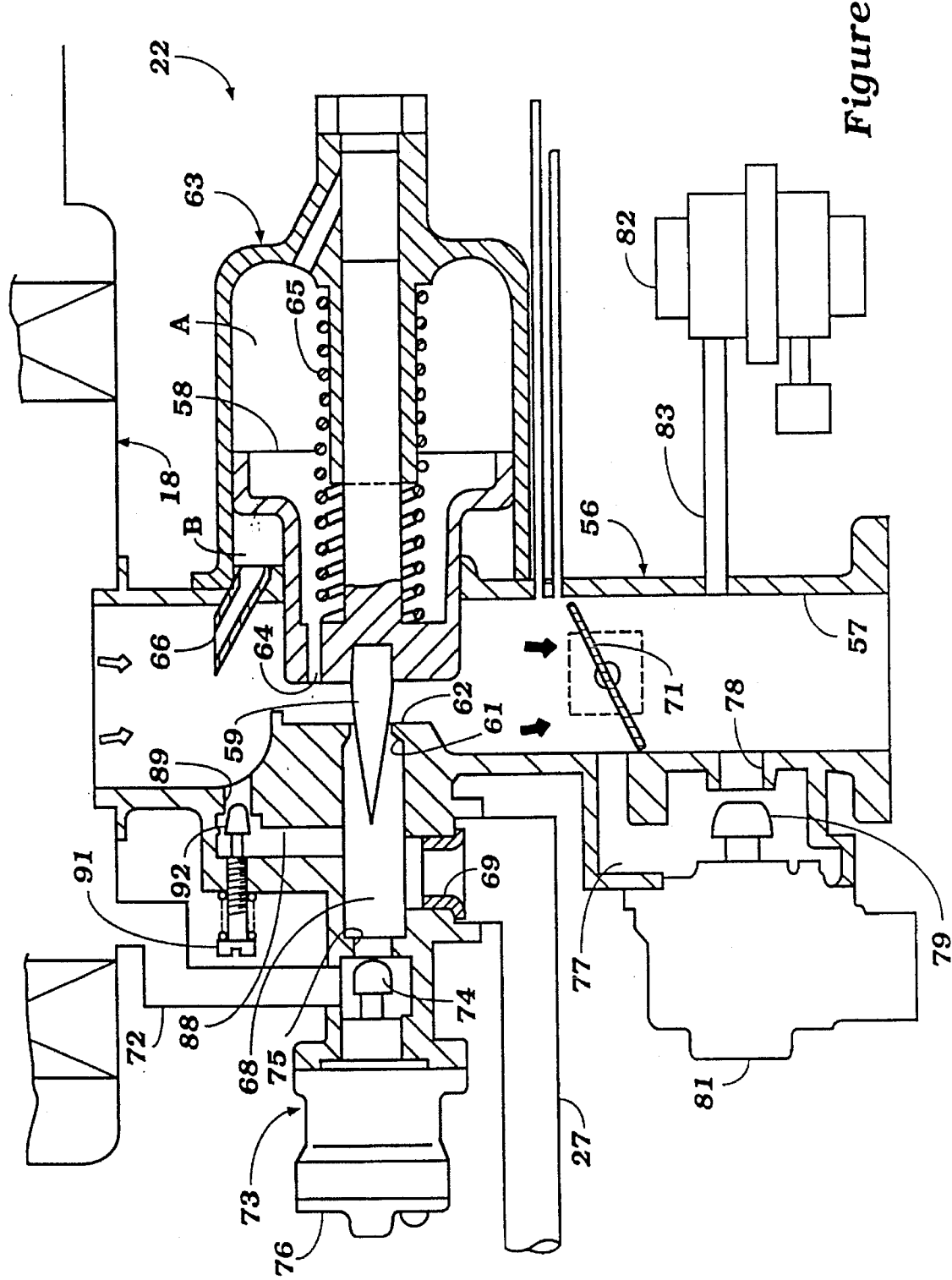
FIG. 2 is an enlarged cross-sectional view taken through the charge former and certain auxiliary components therefor.

This bleed system includes, as shown in FIGS. 1 and 2, an air bleed passage 88 that extends from an inlet port 89 positioned upstream in the induction passage 57 from the sliding piston 58 and downstream from the air cleaner 18. This air bleed passage 88 communicates with the mixing chamber 68. A manually adjustable valve 91 having a valving element 92 cooperates with the bleed opening 89 so as to control the amount of air bled manually into the system. This adjustment of the valve 91 is done only infrequently and may be done either manually, or if desired, an automatic adjustment mechanism may be incorporated, which actuates at predetermined mileage or time intervals. However, this adjustment of the valve 91 is not something that is done continuously during the engine operation, but is only done during service intervals or when the wear of the system or its age requires adjustment.

One actual procedure whereby this adjustment may be made is to run the engine in a hot idle condition and allow the stepper motor 76 to move the valve element 74 to obtain the λ1 condition. If this movement involves positioning other than at the mid-position, then by opening or closing the bleed valve 94, the system can be adjusted to bleed in either less or more additional air so that on the feedback control the stepper motor 76 will position the valve 74 in the 50-percent position to maintain the λ1 condition. When this has been accomplished, then the appropriate adjustment will have been made and need not be made again until after a fairly long time period.

Figure 6:
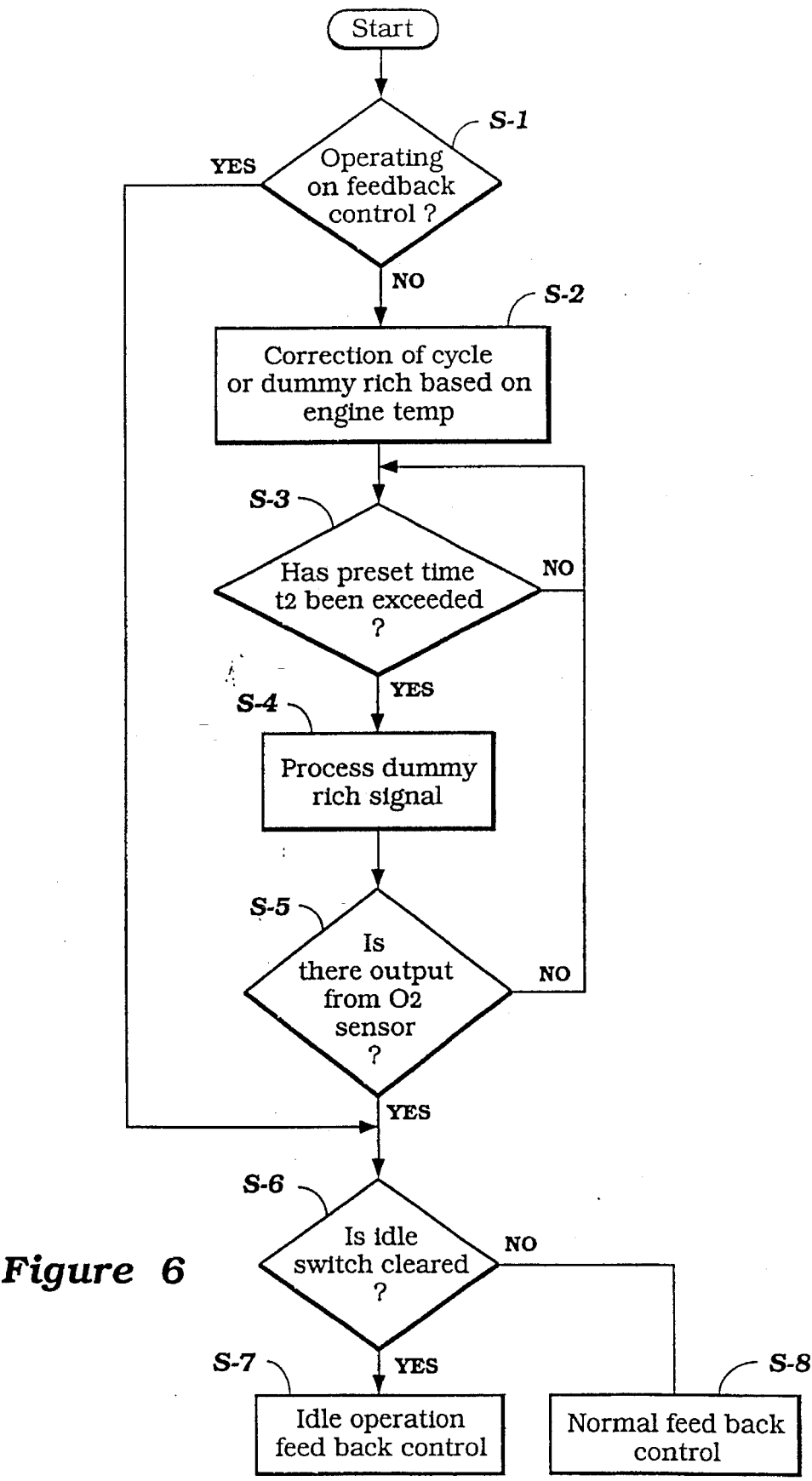
FIG. 6 is a block diagram showing the control routine for engine start-up and the determination of when the engine can be switched over to feedback control.
Figure 7:
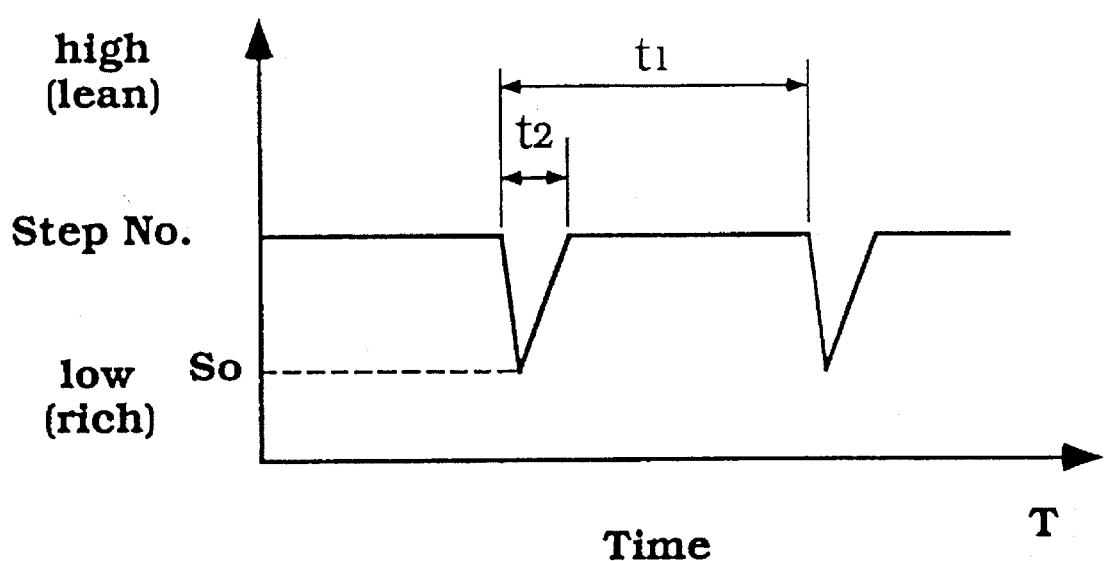
FIG. 7 is a graphical view showing the position of the stepper motor and air bleed control valve during a portion of the start-up operation.

As has been noted, the oxygen sensor 87 must reach an operating temperature before it can be employed for feedback control. Therefore and in accordance with an embodiment of the invention, an arrangement is provided for operating the air bleed valve 74 and stepper motor 76 in a way so as to maintain a lean air/fuel ratio during initial starting and in enriching this mixture temporarily during the warmup operation to determine when the oxygen sensor 87 outputs a signal. As soon as this signal is determined, the system switches over to the feedback control. The way this is done will now be described by reference to FIGS. 6 and 7 with FIG. 6 showing the control routine and FIG. 7 being a graphical view showing how the temporary enrichments are achieved.

Referring first to FIG. 4, once the program starts it moves to the step S1 to determine if the engine is operating on feedback control. The way this is determined is whether the engine has originally been started and also whether the water temperature of the engine or the temperature in the exhaust is sensed by the temperature of the catalytic converter by the temperature sensor 86 is high enough to indicate that feedback control is possible because of the fact that the oxygen sensor will be at its operating temperature. It is to be understood that this determination may be made in any known manner.

If the system is not operating on feedback control mode then the program moves to the step S2. It should be noted that if at the step S1 the system is not operating under feedback control the ECU 84 will have set the stepper motor 73 and air bleed control valve 74 in a preset predetermined condition determinative of engine speed and engine temperature so as to provide the desired lean mixture.

At the step S2 the system is provided with a pulsed output that will operate the stepper motor 76 and air bleed valve 74 to close the air bleed valve to a predetermined amount $S_o$ which is determined by the actual engine temperature as sensed by the water temperature sensor 85 and for a time period t2 that is also determined by the engine temperature. When the engine temperature is low the dummy rich signal generated $S_o$ will be higher (richer) and the time period t2 is lengthened in accordance with a map programmed into the ECU.

At the step S3 the ECU 84 determines if the time period t2 has been exceeded. If it has not, the program moves back to and repeats at the step S3. If, however, the dummy rich the time period t2 has been exceeded, then the system is returned to the normal lean setting and there is a processing of the dummy signal at the step S4. The program then moves to the step S5 to determine if there is an output from the oxygen sensor 87. If not, the program returns back to the step S3 and initiates another dummy rich signal.

If, however, at the step S5 it is determined that there is an output signal from the oxygen sensor 87 then the program moves to the step S6 to determine if the idle switch, which is incorporated in the carburetor 22 and indicates when the throttle valve 71 is in its idle position is closed. If it is, then the program moves to the step S7 to perform idle operation feedback control. The idle speed may be maintained and the λ1 condition maintained during idle by any desired control routine.

If, however, at the step S6 it is determined that the idle switch is not closed then the program moves to the step S8 so as to provide normal feedback control operation.

It should be readily apparent that this described system permits a very simple way of operating the engine to maintain the desired λ1 condition and, at the same time, permit lean operation during cold start-up and before the oxygen sensor is at the temperature where it will provide an output signal. This is done without the necessity of providing a continually over-rich mixture. Once the oxygen sensor is at the operating temperature and outputting signals, then normal feedback control routines may be employed.

It is to be understood that the foregoing description is that of a preferred embodiment of the invention and that various changes and modifications may be made without departing from the spirit and scope of the invention, as defined by the appended claims.

I claim:

1. An engine having an induction system including a charge former for supplying a fuel air mixture to said engine, said charge former comprising an air induction passage for receiving atmospheric air and a fuel supply circuit for receiving fuel from a source and mixing said fuel with the air in said induction passage for forming a fuel/air mixture for said engine, mixture control means for controlling the mixture strength, an engine combustion sensor for detecting the air/fuel ratio, feedback control means for receiving a signal from said engine combustion sensor and controlling said mixture control means to maintain the desired air/fuel ratio, said engine combustion sensor having an operating temperature below which it will not output a signal, means for determining a condition when said engine combustion temperature may be below said predetermined condition and disabling the feedback control for said control means for providing a leaner than stoichiometric air/fuel ratio for a first predetermined time period, means for providing a richer than stoichiometric air/fuel ratio at timed intervals during said first predetermined time period for a second predetermined time period shorter than said first predetermined time period to determine if the engine combustion sensor is outputting a signal, and means for returning to feedback control immediately when said engine combustion sensor outputs a signal during one of said second predetermined time periods indicating the existence of a rich mixture.

2. The engine as set forth in claim 1, wherein the richness of the rich fuel/air mixture is determined by the temperature of the engine.

3. The gaseous fueled engine as set forth in claim 1, wherein the second predetermined time is determined by the temperature of the engine.

4. The engine as set forth in claim 3, wherein the richness of the rich fuel/air mixture is also determined by the temperature of the engine.

5. The engine as set forth in claim 1, wherein the charge former comprises an air valve type carburetor having a pressure control valve in the induction passage for maintaining a constant pressure drop thereacross and a main fuel metering valve operably connected to said air valve for controlling the rate of discharge of the fuel mixture from the fuel supply circuit.

6. The engine as set forth in claim 5, wherein the richness of the rich fuel/air mixture is determined by the temperature of the engine.

7. The engine as set forth in claim 5, wherein the second predetermined time is determined by the temperature of the engine.

8. The engine as set forth in claim 7, wherein the richness of the rich fuel/air mixture is also determined by the temperature of the engine.

9. A method of operating an engine having an induction system including a charge former for supplying a fuel air mixture to said engine, said charge former comprising an air induction passage for receiving atmospheric air and a fuel supply circuit for receiving fuel from a source and mixing said fuel with the air in said induction passage for forming a fuel/air mixture for said engine, a mixture of control means for controlling mixture control means control valve in said air bleed passage for controlling the amount of air bled into said fuel supply circuit to control the mixture strength, an engine combustion sensor for detecting the air/fuel ratio, said method comprising the steps of controlling said automatic air bleed to maintain the desired air/fuel ratio from the output of said engine combustion sensor, said engine combustion sensor having an operating temperature below which it will not output a signal, determining a condition when said engine combustion temperature may be below said predetermined condition and discontinuing the feedback control for said mixture control means, providing a leaner than stoichiometric air/fuel ratio for a first predetermined time period, providing a richer than stoichiometric air/fuel ratio at timed intervals during said first predetermined time period for a second predetermined time period shorter than said first predetermined time period to determine if the engine combustion sensor is outputting a signal, and returning to feedback control when said engine combustion sensor outputs a signal during one of said second predetermined time periods indicating the existence of a rich mixture.

10. The method of operating engine as set forth in claim 9, wherein the richness of the rich fuel/air mixture is determined by the temperature of the engine.

11. The method of operating engine as set forth in claim 9, wherein the second predetermined time is determined by the temperature of the engine.

12. The method of operating gaseous fueled engine as set forth in claim 11, wherein the richness of the rich fuel/air mixture is also determined by the temperature of the engine.

13. The method of operating engine as set forth in claim 9, wherein the charge former comprises an air valve type carburetor having a pressure control valve in the induction passage for maintaining a constant pressure drop thereacross and a main fuel metering valve operably connected to said air valve for controlling the rate of discharge of the fuel mixture from the fuel supply circuit.

14. The method of operating engine as set forth in claim 13, wherein the richness of the rich fuel/air mixture is determined by the temperature of the engine.

15. The method of operating engine as set forth in claim 13, wherein the second predetermined time is determined by the temperature of the engine.

16. The method of operating engine as set forth in claim 15, wherein the richness of the rich fuel/air mixture is also determined by the temperature of the engine.

\* \* \* \* \*